United States Patent [19]
Behaghel et al.

[11] Patent Number: 5,848,242
[45] Date of Patent: Dec. 8, 1998

[54] LOCAL AREA NETWORK INTERCONNECTION SYSTEM IMPLEMENTING A ROUTING PROTOCOL OF THE "SOURCE ROUTING" TYPE AND INTERCONNECTION EQUIPMENT INTENDED TO BE USED IN SUCH A SYSTEM

[76] Inventors: Denis Behaghel, 5, Residence La Gaillarderie, 78590 Noisy Le Roi; Alain Burgain, 25, rue Campagne Premiére, 75014 Paris; Abdelhamid Ould Ali, 9 Allée Louise Bruneau, 91120 Palaiseau, all of France

[21] Appl. No.: 499,875

[22] Filed: Jul. 10, 1995

[30] Foreign Application Priority Data

Jul. 12, 1994 [FR] France .................................. 9408654

[51] Int. Cl.⁶ .................................................. H04L 12/66
[52] U.S. Cl. ............................... 395/200.48; 395/200.75; 395/200.79; 370/392; 370/393; 370/903
[58] Field of Search ........................... 395/200.2–200.15, 395/200.48, 200.75, 200.79; 370/85, 15, 60, 94.1, 392, 393, 903

[56] References Cited

U.S. PATENT DOCUMENTS

| | | | |
|---|---|---|---|
| 4,488,288 | 12/1984 | Turner . | |
| 4,947,390 | 8/1990 | Sheehy | 370/85.13 |
| 5,095,480 | 3/1992 | Fenner | 370/94.1 |
| 5,136,580 | 8/1992 | Videlock et al. | 370/60 |
| 5,323,394 | 6/1994 | Perlman | 370/85.13 |
| 5,426,637 | 6/1995 | Derby et al. | 370/85.13 |
| 5,430,728 | 7/1995 | Narayanan et al. | 370/85.13 |
| 5,530,963 | 6/1996 | Moore et al. | 395/200.13 |
| 5,570,466 | 10/1996 | Oechsle | 395/200.15 |

FOREIGN PATENT DOCUMENTS 0281785  9/1988  European Pat. Off. .

OTHER PUBLICATIONS

"Interconnections: Bridges and Routers" (Chapter 4, Paragraph 1), by Radia Perlman, published May 1992 by Addison–Wesley Publishing Company, Inc.
EFOC/LAN '92 Conferencr, Paris, FR, pp. 287–292 R. Oechsle et al "Shortest Path Trees Bridging for Broadband LAN Interconnection".

Primary Examiner—Robert B. Harrell
Assistant Examiner—Saleh Najjar
Attorney, Agent, or Firm—Venable, Baetjer, Howard & Civiletti, LLP

[57] ABSTRACT

Interconnection of local area networks, which use a protocol of the "Source Routing" type, through a wide area network involves pieces of interconnection equipment each having a configuration memory which avoids systematic broadcast of discovery frames on the wide area network. Machine learning by these pieces of interconnection equipment stores in respective configuration memories the address of the interconnection equipment through which a local area network containing a destination station is situated. For a given size of routing information field, the maximum number of interconnected networks is doubled.

20 Claims, 5 Drawing Sheets

LOCAL AREA NETWORK INTERCONNECTION SYSTEM IMPLEMENTING A ROUTING PROTOCOL OF THE "SOURCE ROUTING" TYPE AND INTERCONNECTION EQUIPMENT INTENDED TO BE USED IN SUCH A SYSTEM

BACKGROUND OF THE INVENTION

1. Field of the Invention

The present invention relates to a local area network interconnection system implementing a routing protocol of the "Source Routing" type, through a wide area network via pieces of interconnection equipment.

The invention has highly significant applications in the category of interconnection of remote local area networks, more particularly, the interconnection of local area networks of the Token Ring type.

2. Discussion of the Related

Such a protocol is described in the publication by Radia Perlman, entitled "Interconnections: Bridges and Routers" (Chapter 4, Paragraph 1) and published in May 1992 by "Addison-Wesley Publishing Company, Inc.".

In brief, the basic principle of this type of protocol is the following: the route a frame is to follow to reach a destination station is inserted in the header of this frame by the source station. Before any communication with a remote station, the source station is thus to discover the route to be used. Therefore, it transmits to the remote destination station a specific frame called discovery frame which contains a routing information field (RIF). This frame is broadcast to the whole system so as to reach all the interconnected local area networks, and its routing information field is updated as it advances through the network in ordre to indicate the route that is followed.

Only the destination station transmits a response to the source station by indicating in the routing information field the route it will have previously selected.

When the source station receives this response, it stores said route, so that it can be inserted into the header of the future frames that are addressed to this remote station.

This method has the major drawback of bringing about a systematic broadcast of the discovery frames on the wide area network, which has consequences to the actual network in terms of switching power and to the user in terms of cost.

SUMMARY OF THE INVENTION

An object of the present invention is to propose a local area network interconnection system which obviates these drawbacks.

Therefore, a local area network interconnection system according to the invention and as described in the opening paragraph is characterized in that each of the pieces of interconnection equipment:

comprises a memory called configuration memory intended to comprise, at least for each destination farther than the wide area network, the address in the wide area network of the piece of interconnection equipment connecting said destination, and comprises:
learning means for learning this address,
searching means for searching in said memory the destination of the received frames,
and means for establishing a connection to said piece of interconnection equipment when said destination is known.

In this manner it is avoided that discovery frames are systematically broadcast on the wide area network each time a session is established between two remote stations.

In another embodiment the configuration memory of each piece of interconnection equipment is also intended to comprise the route to be followed to reach each one of said destinations from this piece of equipment, and said pieces of interconnection equipment comprise:

receiving means for receiving a discovery frame,
search means for searching the destination of this frame in the configuration memory,
and responding means for responding directly to the discovery frame by indicating the route to be followed, if this destination is found there.

Thus, when future sessions are established, it is no longer necessary to transmit the discovery frame to the destination station.

In another particularly advantageous embodiment the addresses of the stations of said local area networks are structured in such a way that they contain a number of the network followed by a number of the station in this network, and the destination stored in said configuration memory is the number of the network in which the destination station is located.

Thus, the learning of the addresses by the pieces of interconnection equipment consists of learning entire networks and not the stations one by one. This provides the advantage of diminishing the size of the configuration memory necessary in each piece of interconnection equipment, of considerably increasing the learning speed of these pieces of equipment and, finally, of being able to move a station in the local area network in a manner totally transparent to the whole system.

In another particularly advantageous embodiment, an interconnection system according to the invention comprises storage means, so that the part of the route situated beyond the wide area network is stored in a memory of the piece of interconnection equipment connecting said destination station when a session is established between a source station and a destination station.

Thus, only the local part of the route is useful for the source station to transmit the frames to the wide area network. The size of the routing information field restricts the number of networks that may separate two remote stations in an interconnection system as described above to a given value. In this embodiment it is thus the number of networks separating the two stations from the wide area network that is restricted to said value. Worded differently, the maximum number of interconnected networks is doubled.

It is highly significant to observe that, when a session is established between a source station and a destination station, storage means for storing the part of the route situated beyond the wide area network in a memory of the piece of interconnection equipment connecting said destination station can also be used in a local area network interconnection system which utilizes a "Source Routing" protocol, independently of the other characteristics of the invention.

In another embodiment, an interconnection system according to the invention comprises at least one station connected directly to the wide area network, while a virtual address of the same format as that of the stations of said local area networks is assigned to said station, and each of the pieces of interconnection equipment of the wide area network comprises a Table of Correspondence between said virtual address and the address of said station in the wide area network.

These direct connection means for directly connecting a station to the wide area network (assignment of a virtual address to said station and of a Table of Correspondence to each of the pieces of interconnection equipment of the wide area network), can also be used in a local area network interconnection system which utilizes a "Source Routing" protocol, independently of the other characteristics of the invention.

The invention also relates to a piece of interconnection equipment which comprises means that make it suitable for use in a network interconnection system as described above.

BRIEF DESCRIPTION OF THE DRAWINGS

These and other aspects of the invention will be apparent from and elucidated with reference to the embodiments described hereinafter.

In the drawings.

DESCRIPTION OF PREFERRED EMBODIMENTS

Figure 1:
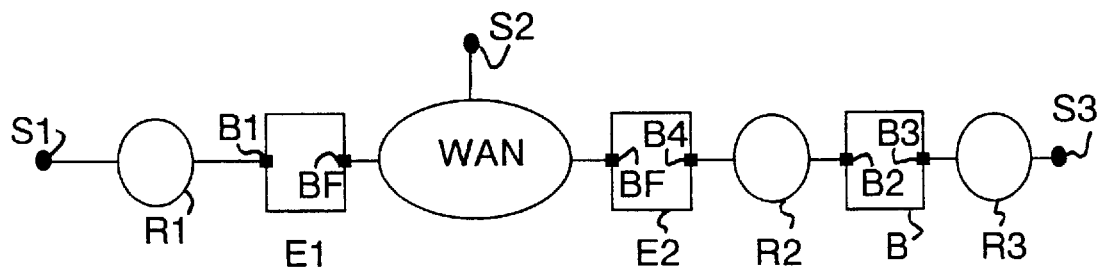
FIG. 1 shows in a diagram an embodiment for the interconnection system according to the invention, FIG. 2 partially shows a frame carried over networks of the Token Ring type in conformity with IEEE standard 802.5.

According to FIG. 1, an interconnection system according to the invention comprises a plurality of local area networks denoted R1, R2 and R3, a station S1 being connected to the local area network R1 and a station S3 to the local area network R3. The local area networks R1 and R2 are connected each to a wide area network WAN via respective pieces of interconnection equipment E1 and E2. The local area network R3 is connected to the local area network R2 via a bridge B. Finally, a station S2 is connected directly to the wide area network WAN.

In this illustrative embodiment, the local area networks are networks of the Token Ring type and the wide area network is an X25 network whose addressing format is defined by Recommendation X121 of the CCITT. The invention, however, is not restricted to these types of networks and could also apply to networks of the switched network type or integrated services network, for example.

The local area networks of the Token Ring type use a "Source Routing" protocol as has been briefly set out in the introduction.

Figure 2:
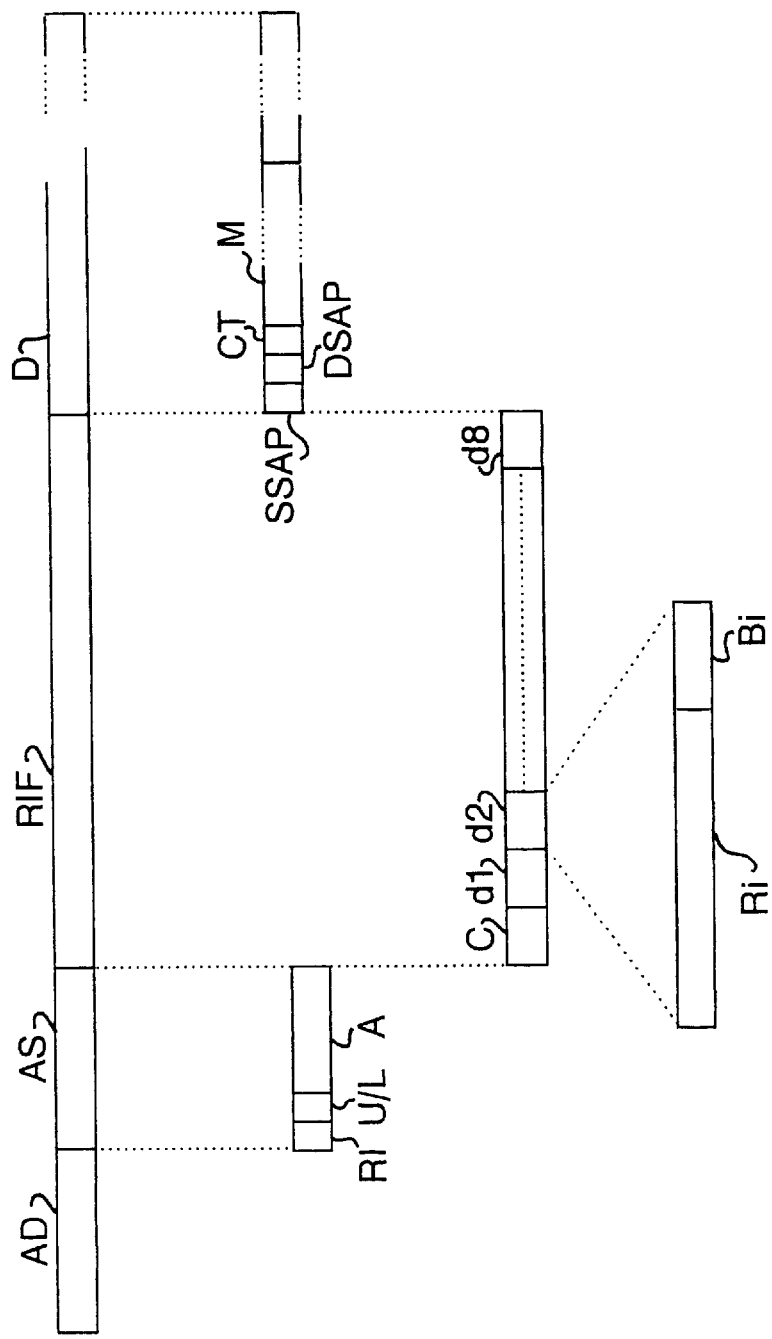

FIG. 2 gives a diagrammatic representation of the format of a frame carried on networks of the Token Ring type in conformity with IEEE standard 802.5.

According to FIG. 2 such a frame contains:

a field AD of 6 octets, containing the destination address of the frame, a field AS of 6 octets, containing the source address of the frame, an optional routing information field RIF, having a maximum of 18 octets, and a data field D of variable length.

Such a frame also comprises other fields (for example, a field marking off the start and end of the frame, a check field, an access field . . . ) which are not useful for the rest of the description and are thus not shown here. Any additional detail in this respect could be found in the IEEE standard 802.5, for example.

In a more detailed manner, the field AS of this frame contains:

a field RI of one bit, indicating whether the frame contains a routing information field RIF, a field U/L, indicating whether the address has a local format or a universal format (a universal address is a unique address assigned to the piece of equipment during its manufacture and stored in a ROM memory, whereas a local address is an address given locally), a field A of 46 bits, containing the actual address.

Similarly, the field RIF of this frame comprises:

a check field C of 2 octets, which specifically contains 3 bits that indicate the broadcast mode of the frame (no broadcast if the RIF frame contains a specific route for transmitting the frame through the system, general broadcast of the frame on the whole system to the destination station which will thus receive therefrom a plurality of copies, or simple broadcast of the frame, so that a single frame arrives at the destination station), followed by 5 bits for encoding the length of the field RIF, and 1 bit for indicating the direction in which this field is read (from left to right or from right to left), a series of a maximum of 8 fields di (i=1 to 8) for designating the route, each field having a length of 2 octets. Each of these fields di is formed by a network number Ri encoded in the first 12 bits followed by an equipment number Bi encoded in the last 4 bits.

Each bridge and piece of interconnection equipment is thus to be configured with a network number and an equipment number for each of its ports. Each route could thus be written in the form of an alternated sequence of network and equipment numbers.

In the rest of the description the selected notations are the following: the network numbers are denoted R1, R2 and R3 respectively, for the three local area networks, and a virtual network number RF is assigned to the wide area network. Moreover, the numbers B1 and BF are assigned to the piece of equipment E1 for its ports to the networks R1, and RF, respectively; the numbers BF and B4 are assigned to the piece of equipment E2 for its ports to the networks RF and R2, respectively; finally, the numbers B2 and B3 are assigned to bridge B for its ports to the networks R2 and R3, respectively.

According to the invention a local addressing is used for the whole system, while the selected addressing plane consists of structuring the addresses of the stations in the following manner: number of the local area network to which the station is connected, encoded in 12 bits, followed by a station number encoded in 2 bits. In addition, as a network number will be advantageously selected that which is configured in the bridges and pieces of interconnection equipment for reasons of routing. Thus, the addresses of the stations S1 and S3 are written, respectively, R1.S1 and R3.S3 where S1 and S3 represent a binary word of 2 octets.

Finally, the data field of the frame shown in FIG. 2 carries the frames of the data link layer which themselves contain:

a first field SSAP (Source Service Access Point) encoded in 1 octet, indicating the address of the access point at the interface between the network layer and the data link layer in the transmit mode, a second field DSAP (Destination Service Access Point) encoded in 1 octet, indicating the address of the access point at the interface between the data link layer and the network layer in the receive mode, a third field CT called check field encoded in one octet, indicating the type of frame; for the discovery frames it is a TEST frame, a fourth field M encoded in 27 octets, containing the payload, that is to say, in this case a message indicating that it is a discovery frame.

Figure 3:
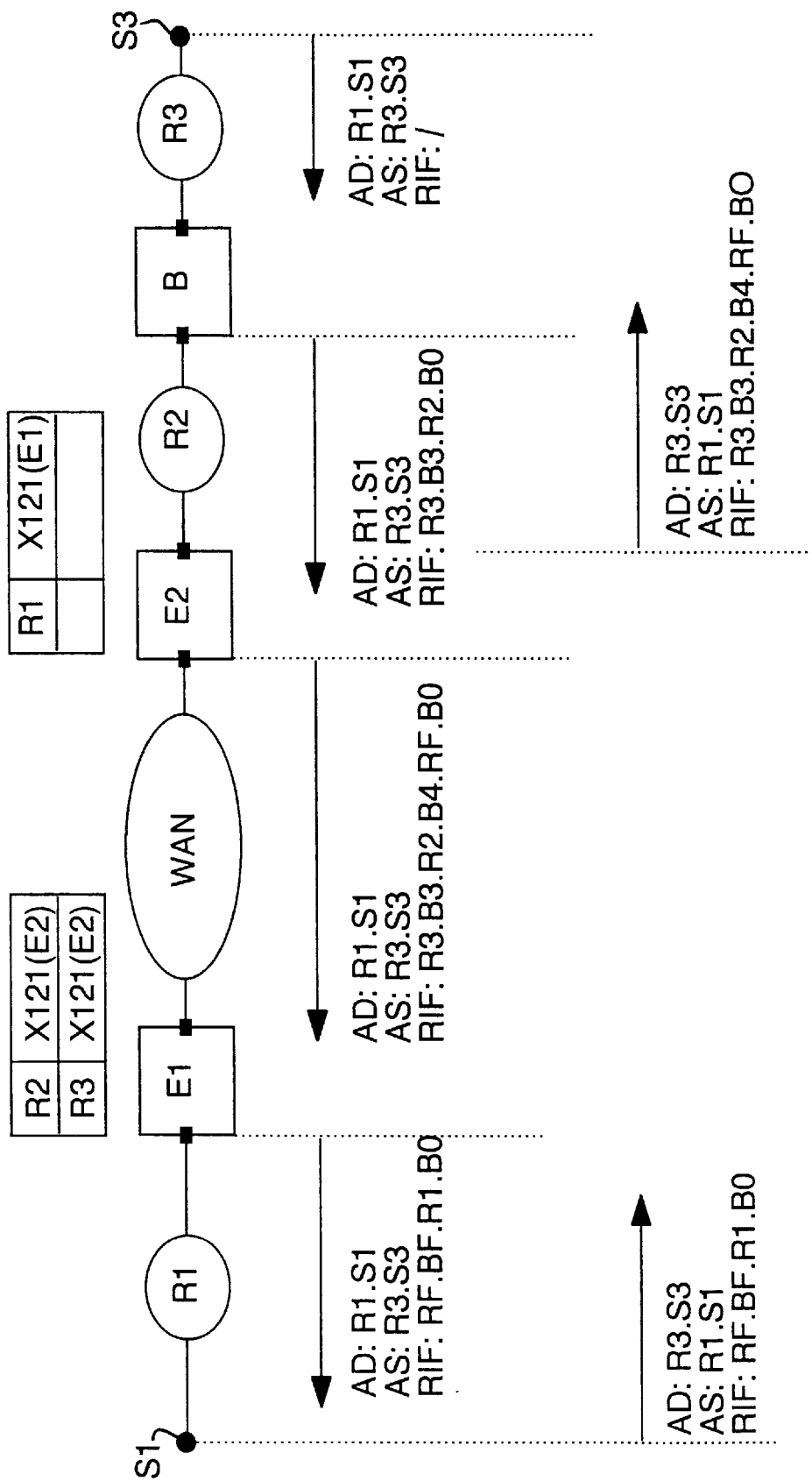
FIG. 3 shows in a diagram the operation of an interconnection system according to the invention with respect to the communication between two remote stations connected each to a local area network of the Token Ring type.

FIG. 3 describes the operation of an interconnection system according to the invention when there is a communication between the two stations S1 and S3.

When station S3 wishes to establish a session with station S1, it starts by transmitting a discovery frame having S1 as its destination. The field AS of this frame contains the address R3.S3 of the station S3, its field AD contains the address R1.S1 of the station S1 (supposedly known), and the field C of the field RIF indicates that the frame is to be broadcast (general or simple broadcast).

When this frame arrives at bridge B, this bridge completes the field RIF by indicating the covered route, that is to say, R3.B3.R2.B0 (the frame has first passed through ring R3, leaves R3 and passes through the port B3 of the bridge B, is relayed by the bridge B to the ring R2 and as the output port of the ring R2 is unknown for the moment, it is denoted B0). Then the bridge B broadcasts the frame on the network R2.

When the frame arrives at the piece of equipment E2, the latter updates the field RIF which assumes the value R3.B3.R2.B4.RF.B0. It buffers the value of this RIF in a memory called context memory, and opens virtual circuits to all the remote pieces of interconnection equipment of the wide area network so as to send the frame thereto, and, more specifically, a virtual circuit CV to the piece of interconnection equipment E1 (at this point there is assumed that the connecting line of the destination station is unknown to piece of equipment E2).

When the pieces of interconnection equipment receive the frame, each of them:

stores in its configuration memory that the rings R2 and R3 depend on the piece of interconnection equipment E2 (in practice it stores the X121 address of the piece of interconnection equipment E2), stores in its context memory the number of the virtual circuit that corresponds to this session, updates the field RIF by retaining only its local part (RF.BF.R1.B0 for the piece of interconnection equipment E1), broadcasts the frame.

When the frame arrives at the station S1, this station responds thereto by transmitting a response frame having station S3 as its destination. The field AD of this frame contains the address R3.S3 of the station S3 and its field AS contains the address R1.S1 of the station S1. The read direction bit of its field RIF is inverted, its field C indicates that this response frame is not to be broadcast, and its fields di contain the route indicated in the field RIF of the received frame, that is, RF.BF.R1.B0.

The piece of interconnection equipment E1 transmits the response frame to the piece of interconnection equipment E2 via the virtual circuit CV. On the other hand, the piece of interconnection equipment E1 stores the contents of RIF in the context memory for the duration of the session. This enables the piece of interconnection equipment E1 to know, when it will receive a frame from S3 having S1 as its destination, that the route to be used is RF.BF.R1.B0. This information is to be distinguished from that stored in the configuration memory which is there either definitively by the configuration of the system, or for a limited period of time, which is much longer than the average period of time of a session between two stations.

This response frame thus reaches the piece of interconnection equipment E2, which:

then learns that the network R1 depends on the piece of interconnection equipment E1, and records the X121 address of this piece of equipment, writes in its context memory the number of the virtual circuit to be used for this session, empties the field RIF of the frame and replaces this field by that which it had previously stored, that is to say, R3.B3.R2.B4.RF.B0.

The frame thus formed finally arrives at the station S3 which then stores that the route to be used for reaching the station S1 is the route R3.B3.R2.B4.RF.B0 contained in the field of the frame it receives. Then, when the station S3 thereafter wishes to transmit a frame to the station S1, it indicates the route R3.B3.R2.B4.RF.B0 to be used for reaching the station S1; and when the frame arrives at the piece of interconnection equipment E2 the latter seeks in its context memory the number of the virtual circuit to be used. When the piece of equipment E1 in its turn receives said frame, it seeks in its context memory the route to be used for reaching the station S1, that is to say, RF.BF.R1.B0 and it fills the field RIF before transmitting the frame.

At the end of each session, the contents of the context memory are deleted, so that at the start of each new session, the source station is to broadcast a discovery frame to discover the route to the destination station. If the information contained in the configuration memory relating to the corresponding destination is still living, the local piece of interconnection equipment responds directly to the source station without even transmitting the discovery frame to the remote piece of interconnection equipment.

It is significant to observe that according to this mode of operation the pieces of interconnection equipment of the wide area network learn the local area networks instead of learning the stations one by one. This is made possible by the structure imposed on the addresses of the stations, which structure makes it possible, based upon the address of the destination station of the frame, to localize immediately the ring to which the station is connected. In the cases where it would be impossible to impose such a structure on the addresses, they are the stations that would be learned by the pieces of interconnection equipment.

Figure 4:
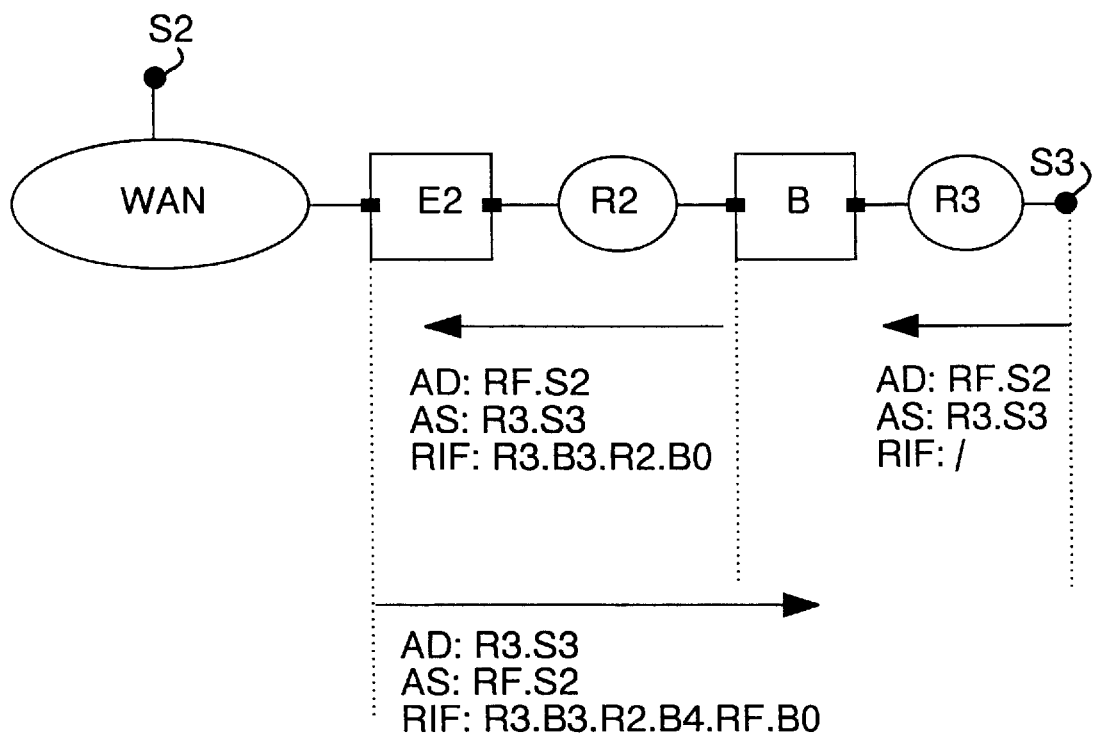
FIG. 4 shows in a diagram the operation of an interconnection system according to the invention with respect to the communication between a first station connected to a local area network of the Token Ring type and a second station connected directly to the wide area network.

FIG. 4 describes the functioning of the invention during a communication between station S2 and station S3. The fact that the station can be directly connected to the wide area network determines that additional means are to be used. In effect, the protocols used by these two stations are different, which makes it impossible for them to communicate directly with each other. It is thus necessary to design the pieces of interconnection equipment of the wide area network in such a way that this network can respond directly to the discovery frame transmitted by the station S3. And, therefore, it is also necessary to assign to the station S2 a virtual address, of the same format as those of the stations S1 and S3 which are connected in a conventional manner to local area networks (the actual address of the station is an X121 address in the example described here). This virtual address is thus written as RF.S2, where S2 represents the number of the station S2 encoded in 2 octets.

Each piece of interconnection equipment of the wide area network comprises thus a Table of Correspondence between the actual address having the X121 format of the station S2 and its virtual address RF.S2.

Then, when the station S3 transmits a discovery frame having station S2 as its destination, which has RF.S2 as its destination address, the piece of interconnection equipment E2 receiving this frame seeks in its Table of Correspondence the X121 address of S2 and opens a virtual circuit to S2. Then it responds directly to S3 by copying the routing information field of the discovery frame it has received.

Figure 5:
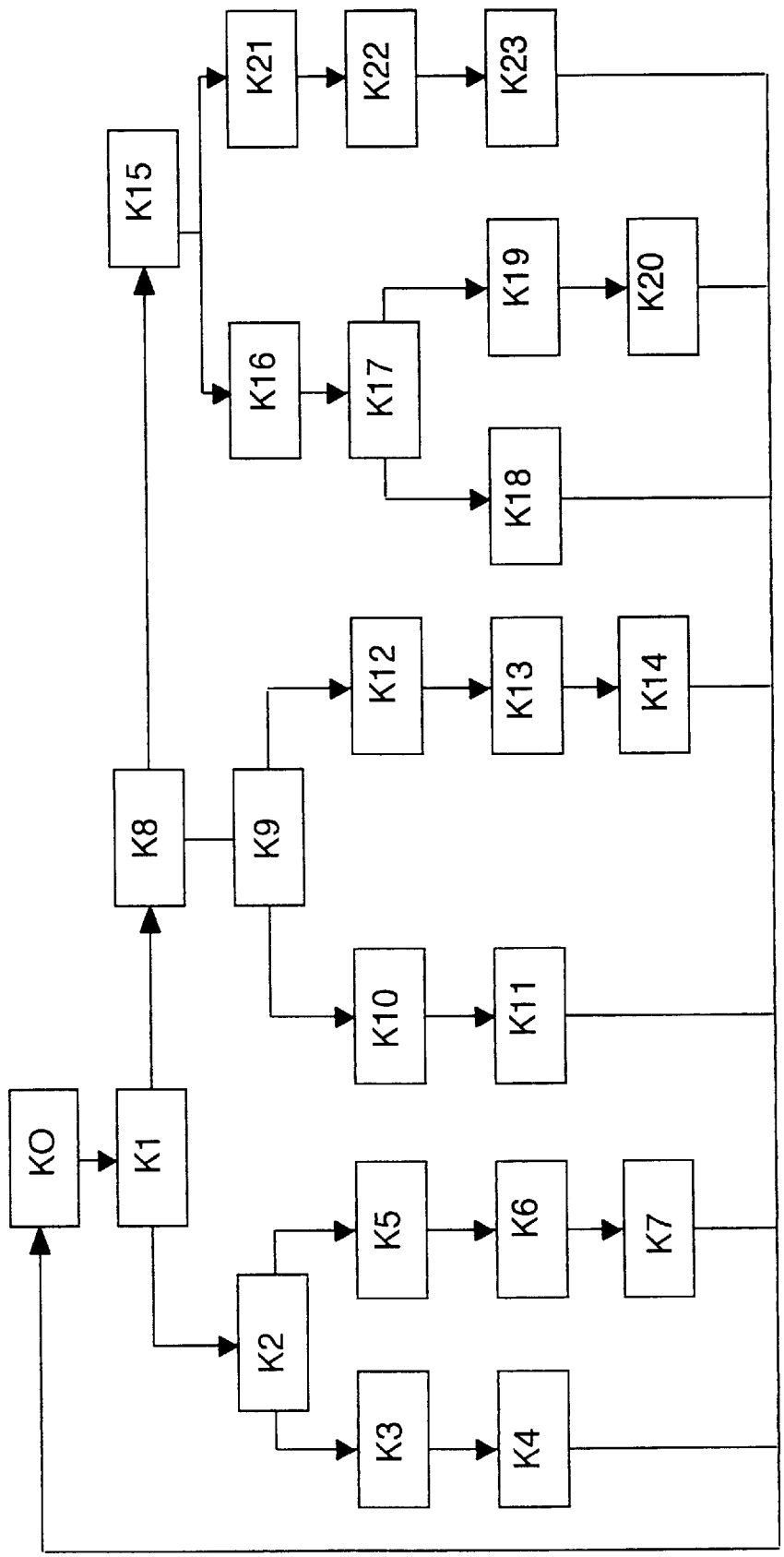
FIG. 5 shows an operational flow chart for a piece of interconnection equipment according to the invention.

FIG. 5 shows an operational flow chart for such a piece of interconnection equipment. The various boxes of this flow chart will be described below:

- box K0: the piece of equipment is waiting for the arrival of a frame on one of its ports. The moment it receives one, box K1 is proceeded to.
- box K1: the piece of equipment examines whether it is a discovery frame or not (which is indicated by the data field of the data link frame, this frame itself being carried in the data field of the physical frame represented in FIG. 2). If a discovery frame is concerned, box K8 is proceeded to. If not, a data frame is concerned and box K2 is proceeded to.
- box K2: if the frame has been received on a LAN port of the piece of equipment (that is to say, on a port for connecting to a local area network), box K3 is proceeded to. If not, the frame has been received on a WAN port (that is to say, on a port for connecting to the wide area network), and the piece of equipment proceeds to box K5.
- box K3: the piece of equipment seeks in its context memory, based upon field AD, the number of the virtual circuit to be used for this session, and box K4 is proceeded to.
- box K4: the piece of equipment suppresses the route contained in the field RIF and transmits the frame received on said virtual circuit. Then box K0 is returned to.
- box K5: the piece of equipment seeks in its context memory the route to be followed for this session (that is to say, the route to be used to reach the destination of the frame). Then box K6 is proceeded to.
- box K6: the piece of equipment writes said route in the field RIF of the frame, after which box K7 is proceeded to.
- box K7: the piece of equipment transmits the frame to the local area network indicated by said route. Then box K0 is returned to.
- box K8: the piece of equipment examines whether the received discovery frame is a question or response frame (this is indicated by the last bit of the field SSAP of the data link frame). If a response is concerned, box K9 is proceeded to; if not, box K15 is proceeded to.
- box K9: if the frame has been received on a LAN port of the piece of equipment, box K10 is proceeded to; if not, box K12 is proceeded to.
- box K10: the piece of equipment writes the contents of field RIF of the frame in its context memory and box K11 is proceeded to.
- box K11: the piece of equipment reads in its context memory the number of the virtual circuit to be used for this session and transmits the frame through this virtual circuit. Then box K0 is proceeded to.
- box K12: the piece of equipment writes in its configuration memory that the networks indicated in the field RIF of the received frame depend on the remote piece of equipment that has transmitted this frame thereto (that is to say, that it writes the numbers of the networks and the X121 address of the remote connecting line). Then it suppresses the route indicated in the field RIF and box K13 is proceeded to.
- box K13: the piece of equipment writes in the field RIF the route that it had previously stored during the passage of the request frame. And the piece of equipment writes the number of the virtual circuit to be used for this session in its context memory. Then box K14 is proceeded to.
- box K14: the piece of equipment transmits the frame on the local area network indicated in the field RIF. Then box K0 is returned to.
- box K15: if the frame has been received on a LAN port of the piece of equipment, the piece of equipment proceeds to box K16 and, if not, it proceeds to box K21.
- box K16: it updates the field RIF and temporarily stores same in its context memory. Then box 17 is proceeded to.
- box K17: the piece of equipment searches in its configuration memory for the remote piece of equipment connecting to the destination station of the frame. If this station is known, the piece of equipment proceeds to the box K18, if not, to box K19.
- box K18: the piece of equipment transmits directly a response discovery frame to the source station. Then it returns to box K0.
- box K19: the piece of equipment opens virtual circuits to all the configured pieces of interconnection equipment. Then box K20 is proceeded to.
- box K20: the piece of equipment broadcasts the frame on each of these virtual circuits before returning to box K0.
- box K21: the piece of equipment writes in its configuration memory that the networks identified in the field RIF of the received frame depend on the remote piece of equipment which has transmitted this frame thereto. Then the piece of equipment writes in its context memory the number of the virtual circuit to be used for this session, before box K22 is proceeded to.
- box K22: it empties the field RIF of the received frame and updates this field, so that only its local portion is retained. Then box K23 is proceeded to.
- box K23: the piece of equipment transmits the frame on each of the local area networks connected thereto. Then box K0 is returned to.

In the preferred embodiment which has just been described, the part of the route located beyond the wide area network is stored, while a session between a source station and a destination station is being established, in the context memory of the piece of interconnection equipment that connects to the destination station. Thus, the destination station is seen by the source station as being directly connected to the wide area network, and it is thus no use in this case writing the route to be followed for reaching the destination station in the configuration memory of the piece of equipment that connects to the source station.

In a different embodiment according to which the fields RIF are to convey the complete route from beginning to end between a source station (for example, S3) and a destination station (for example, S1), in which the pieces of interconnection equipment E2 and E1 write each in their configuration memory:

the route which permits of reaching the network R1 from the piece of equipment E2, that is to say, R1.B1.RF.B0, the routes permitting of reaching the networks R2 and R3 from the piece of equipment E1, that is to say, R2.B4.RF.B0 and R3.B3.R2.B4.RF.B0.

Then, when, for example, the piece of equipment E1 later receives from the station S1 a discovery frame having station S3 as its destination, if the network R3 has been written in its configuration memory, it can directly respond to station S1 by indicating to station S1 the complete route to R3, that is R1.BF.RF.B4.R2.B3.R3.B0.

Figure 6:
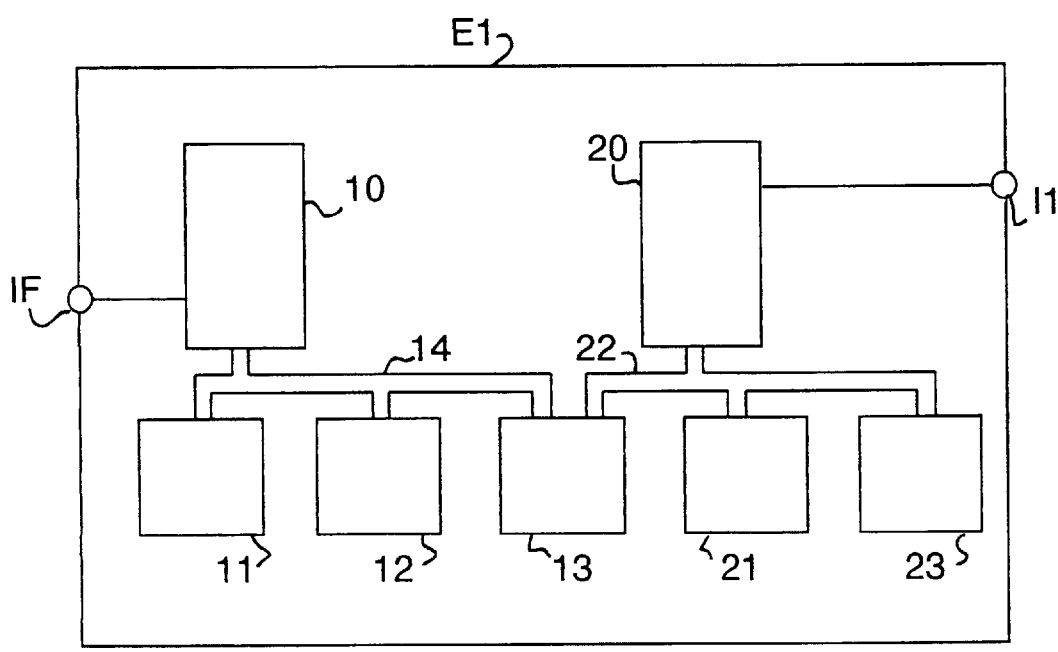
FIG. 6 shows a piece of interconnection equipment according to the invention.

FIG. 6 gives a diagrammatic representation of a piece of interconnection equipment according to the invention.

According to FIG. 6 such a piece of equipment E1 comprises a wide area network interface IF, which is connected to an application processor 10 formed, for example, by a 68360 by Motorola. This processor 10 itself is connected by a bus 14 to a memory 11 which particularly contains the Table of Correspondence between the virtual addresses and the X121 addresses of the stations which are directly connected to the wide area network, as well as the numbers assigned for the routing to each port of the piece of equipment, the physical X121 address of the piece of equipment on the wide area network, the number of the virtual network assigned to the wide area network. The processor 10 is also connected by this bus 14 to a static memory 12 which contains the operating instructions of the processor 10, particularly those necessary for implementing the invention in accordance with the flow chart represented in FIG. 5, and to a random access memory 13 containing data, and, more particularly, the context and configuration memories necessary for implementing the invention. The piece of interconnection equipment E1 also includes at least one local area network interface I1 which is connected to a communication controller 20 which is, for example, a TROLI (Token Ring Optimization Line Interface) manufactured by Pulse Technology, itself connected via a bus 22 to a communication processor 23 formed, for example, by a TMS380C25 by Texas Instruments, and to a static memory 21 containing the operating instructions of the communication processor 23, more particularly those necessary for implementing the invention, and to the data memory 13 described above. The communication between the two processors 10 and 23 thus takes place via the data memory 13.

Needless to observe that modifications can be made in the embodiment that has thus been described, more particularly by substituting equivalent technical means, without one leaving thereby the scope of the present invention.

We claim:

1. A local area network interconnection system implementing a routing protocol of the "Source Routing" type, comprising a wide area network, a plurality of local area networks, and a corresponding plurality of pieces of interconnection equipment interconnecting respective local area networks to the wide area network, characterized in that each of the pieces of interconnection equipment comprises:

a configuration memory for storing, for each destination farther than the wide area network, an address in the wide area network of the piece of interconnection equipment connecting said destination, learning means for learning the corresponding address of each said destination, searching means for searching in said memory the destination of received frames, and means for establishing a connection to said piece of interconnection equipment when said destination is known.

2. A system as claimed in claim 1, characterized in that the system further comprises a station connected directly to the wide area network, said station having an address in the wide area network and a virtual address assigned thereto, the virtual address having a format the same as the format of addresses of stations of local area networks, and each of the pieces of interconnection equipment comprises a table of correspondence between said virtual address and the address in the wide area network.

3. A system as claimed in claim 1, characterized in that addresses of respective destination stations in corresponding local area networks are structured such that said addresses of destination stations contain a corresponding number of the corresponding local area network followed by a number of the respective destination station in said corresponding local area network, and the destination stored in the configuration memory is the number of said corresponding local area network in which the destination station is located.

4. A system as claimed in claim 3, characterized in that in each piece of interconnection equipment, responsive to reception of a given discovery frame from a remote piece of interconnection equipment, said learning means writes the address of said remote piece of interconnection equipment together with the numbers of the networks occurring in the route followed by said discovery frame.

5. A system as claimed in claim 1, characterized in that a given piece of interconnection equipment further comprises respective storage means for storing, responsive to a session being established over a route between a source station and a given destination station situated beyond the wide area network and connected to the wide area network via the given piece of interconnection equipment, the part of said route situated beyond the wide area network.

6. A system as claimed in claim 5, characterized in that said given piece of interconnection equipment further comprises suppressing means for suppressing, at the end of said session, said part of said route stored in the respective storage means.

7. A system as claimed in claim 1, characterized in that the configuration memory of each piece of interconnection equipment is arranged also to store a route to be followed to reach each one of said destinations from a corresponding piece of interconnection equipment, and each of said pieces of interconnection equipment further comprise:

receiving means for receiving a discovery frame, search means for searching a destination of the discovery frame in the configuration memory, and responding means for responding directly to the discovery frame by indicating the route to be followed, if this destination is found there.

8. A system as claimed in claim 7, characterized in that addresses of respective destination stations in corresponding local area networks are structured such that said addresses of destination stations contain a corresponding number of the corresponding local area network followed by a number of the respective destination station in said corresponding local area network, and the destination stored in the configuration memory is the number of said corresponding local area network in which the destination station is located.

9. A system as claimed in claim 8, characterized in that in each piece of interconnection equipment, responsive to reception of a given discovery frame from a remote piece of interconnection equipment, said learning means writes the address of said remote piece of interconnection equipment together with the numbers of the networks occurring in the route followed by said discovery frame.

10. A system as claimed in claim 9, characterized in that a given piece of interconnection equipment further comprises respective storage means for storing, responsive to a session being established over a route between a source station and a given destination station situated beyond the wide area network and connected to the wide area network via the given piece of interconnection equipment, the part of said route situated beyond the wide area network.

11. A system as claimed in claim 10, characterized in that said given piece of interconnection equipment further comprises suppressing means for suppressing, at the end of said session, said part of said route stored in the respective storage means.

12. A system as claimed in claim 11, characterized in that the system further comprises a station connected directly to the wide area network, said station having an address in the wide area network and a virtual address assigned thereto, the virtual address having a format the same as the format of stations of local area networks, and each of the pieces of interconnection equipment comprises a table of correspondence between said virtual address and the address in the wide area network.

13. A local area network interconnection system implementing a routing protocol of the "Source Routing" type, comprising a wide area network, a plurality of local area networks including a first local area network, a corresponding plurality of pieces of interconnection equipment interconnecting respective local area networks to the wide area network, and a second local area network and a bridge interconnecting said first and second local area networks, characterized in that each of the pieces of interconnection equipment comprises:

a configuration memory for storing, for each destination farther than the wide area network, an address in the wide area network of the piece of interconnection equipment connecting said destination, learning means for learning the corresponding address of each said destination, searching means for searching in said memory the destination of received frames, and means for establishing a connection to said piece of interconnection equipment when said destination is known, said first local area network being connected to the wide area network via a given one of said pieces of interconnection equipment, and a given destination station being connected to said second local area network, responsive to a session being established over a route between a remote piece of interconnection equipment and said given destination station, the address of said given one of said pieces being stored in the configuration memory of said remote piece of interconnection equipment, and the part of the route between the given one of said pieces and said given destination station being stored in said given one of said pieces, said part of said route includes said bridge.

14. A system as claimed in claim 13, characterized in that the system further comprises a station connected directly to the wide area network, said station having an address in the wide area network and a virtual address assigned thereto, the virtual address having a format the same as the format of addresses of stations of local area networks, and each of the pieces of interconnection equipment comprises a table of correspondence between said virtual address and the address in the wide area network.

15. A system as claimed in claim 13, characterized in that addresses of respective destination stations in corresponding local area networks are structured such that said addresses of destination stations contain a corresponding number of the corresponding local area network followed by a number of the respective destination station in said corresponding local area network , and the destination stored in the configuration memory is the number of said corresponding local area network in which the destination station is located.

16. A system as claimed in claim 15, characterized in that in each piece of interconnection equipment, responsive to reception of a given discovery frame from a remote piece of interconnection equipment, said learning means writes the address of said remote piece of interconnection equipment together with the numbers of the networks occurring in the route followed by said discovery frame.

17. A system as claimed in claim 13, characterized in that a given piece of interconnection equipment further comprises respective storage means for storing, responsive to a session being established over a route between a source station and a given destination station situated beyond the wide area network and connected to the wide area network via the given piece of interconnection equipment, the part of said route situated beyond the wide area network.

18. A system as claimed in claim 17, characterized in that said given piece of interconnection equipment further comprises suppressing means for suppressing, at the end of said session, said part of said route stored in the respective storage means.

19. A system as claimed in claim 13, characterized in that the configuration memory of each piece of interconnection equipment is arranged also to store a route to be followed to reach each one of said destinations from a corresponding piece of interconnection equipment, and each of said pieces of interconnection equipment further comprise:

receiving means for receiving a discovery frame, search means for searching a destination of the discovery frame in the configuration memory, and responding means for responding directly to the discovery frame by indicating the route to be followed, if this destination is found there.

20. A system as claimed in claim 19, characterized in that addresses of respective destination stations in corresponding local area networks are structured such that said addresses of destination stations contain a corresponding number of the corresponding local area network followed by a number of the respective destination station in said corresponding local area network, and the destination stored in the configuration memory is the number of said corresponding local area network in which the destination station is located.

* * * * *